(12) United States Patent
Stautner et al.

(10) Patent No.: US 9,381,784 B2
(45) Date of Patent: Jul. 5, 2016

(54) STRUT BEARING

(71) Applicant: Schaeffler Technologies AG & Co. KG, Herzogenaurach (DE)

(72) Inventors: Ralf Stautner, Nuremberg (DE); Andreas Wollner, Nuremberg (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 0 days.

(21) Appl. No.: 14/764,323

(22) PCT Filed: Dec. 11, 2013

(86) PCT No.: PCT/DE2013/200354
§ 371 (c)(1),
(2) Date: Jul. 29, 2015

(87) PCT Pub. No.: WO2014/121772
PCT Pub. Date: Aug. 14, 2014

(65) Prior Publication Data
US 2015/0367698 A1    Dec. 24, 2015

(30) Foreign Application Priority Data

Feb. 7, 2013 (DE) .......................... 10 2013 201 965

(51) Int. Cl.
| | |
|---|---|
| *F16C 17/04* | (2006.01) |
| *F16C 33/80* | (2006.01) |
| *F16C 33/74* | (2006.01) |
| *B60G 15/06* | (2006.01) |
| *F16C 33/20* | (2006.01) |

(52) U.S. Cl.
CPC .............. *B60G 15/068* (2013.01); *F16C 17/04* (2013.01); *F16C 33/20* (2013.01); *F16C 33/208* (2013.01); *F16C 33/74* (2013.01); *B60G 2204/418* (2013.01); *B60G 2206/7101* (2013.01); *B60G 2206/81012* (2013.01)

(58) Field of Classification Search
CPC .......... B60G 15/068; B60G 2204/418; B60G 2206/7101; B60G 2206/81012; F16C 33/74; F16C 17/04; F16C 33/20; F16C 33/208; F16C 33/04; F16C 33/80; F16C 35/02; B29C 45/001; B29C 45/14622
USPC ......... 384/124–125, 130, 144, 480, 607, 297, 384/420

See application file for complete search history.

(56) References Cited

U.S. PATENT DOCUMENTS

| | | | | |
|---|---|---|---|---|
| 4,854,745 A | * | 8/1989 | Kamimura | ........... B60G 15/068 384/420 |
| 5,476,326 A | * | 12/1995 | Ueno | .................. B60G 15/067 384/125 |
| 6,918,701 B2 | * | 7/2005 | Ueno | ...................... F16C 17/26 384/125 |

(Continued)

FOREIGN PATENT DOCUMENTS

| | | | | |
|---|---|---|---|---|
| DE | 102008021037 | * | 10/2009 | .......... B29C 45/0001 |
| DE | 102008057590 | | 2/2010 | |

(Continued)

*Primary Examiner* — Marcus Charles
(74) *Attorney, Agent, or Firm* — Volpe and Koenig, P.C.

(57) ABSTRACT

A strut bearing including a cap (2) and a guide ring (3) rotatably mounted about an axis of rotation (D) relative to the cap (2) and including at least one seal, wherein a plain bearing (4) is disposed between the cap (2) and the guide ring (3), and the plain bearing (4) is injection molded onto the guide ring (3).

5 Claims, 1 Drawing Sheet

(56) References Cited

U.S. PATENT DOCUMENTS

| | | | |
|---|---|---|---|
| 8,328,427 B2 * | 12/2012 | Kellam | B60G 15/068 384/420 |
| 2010/0040317 A1 | 2/2010 | Kellam | |
| 2011/0019951 A1 * | 1/2011 | Kaneko | B60G 11/15 384/420 |
| 2011/0262070 A1 | 10/2011 | Zernickel et al. | |
| 2012/0243814 A1 * | 9/2012 | Sakairi | B60G 15/068 384/297 |

FOREIGN PATENT DOCUMENTS

| | | | | |
|---|---|---|---|---|
| DE | 202010009490 | | 2/2010 | |
| DE | 102009028381 | | 2/2011 | |
| DE | 102010011816 | | 9/2011 | |
| DE | 102010015712 | | 10/2011 | |
| DE | 102010024601 | | 12/2011 | |
| DE | 102010026854 | | 1/2012 | |
| DE | 102011087167 | * | 5/2013 | ........... B60G 15/068 |
| DE | 102012212522 A1 | * | 1/2014 | ........... B60G 15/067 |
| EP | 2317167 | | 5/2011 | |
| EP | 2380762 A1 | * | 10/2011 | ........... B60G 15/068 |
| EP | 2574481 A2 | * | 4/2013 | ............. F16C 17/04 |
| JP | 62266217 A | * | 11/1987 | |
| JP | 09-072339 | * | 3/1997 | ............. F16C 33/20 |
| JP | 2009036380 A | * | 2/2009 | |
| JP | 2012145147 A | * | 8/2012 | |

* cited by examiner

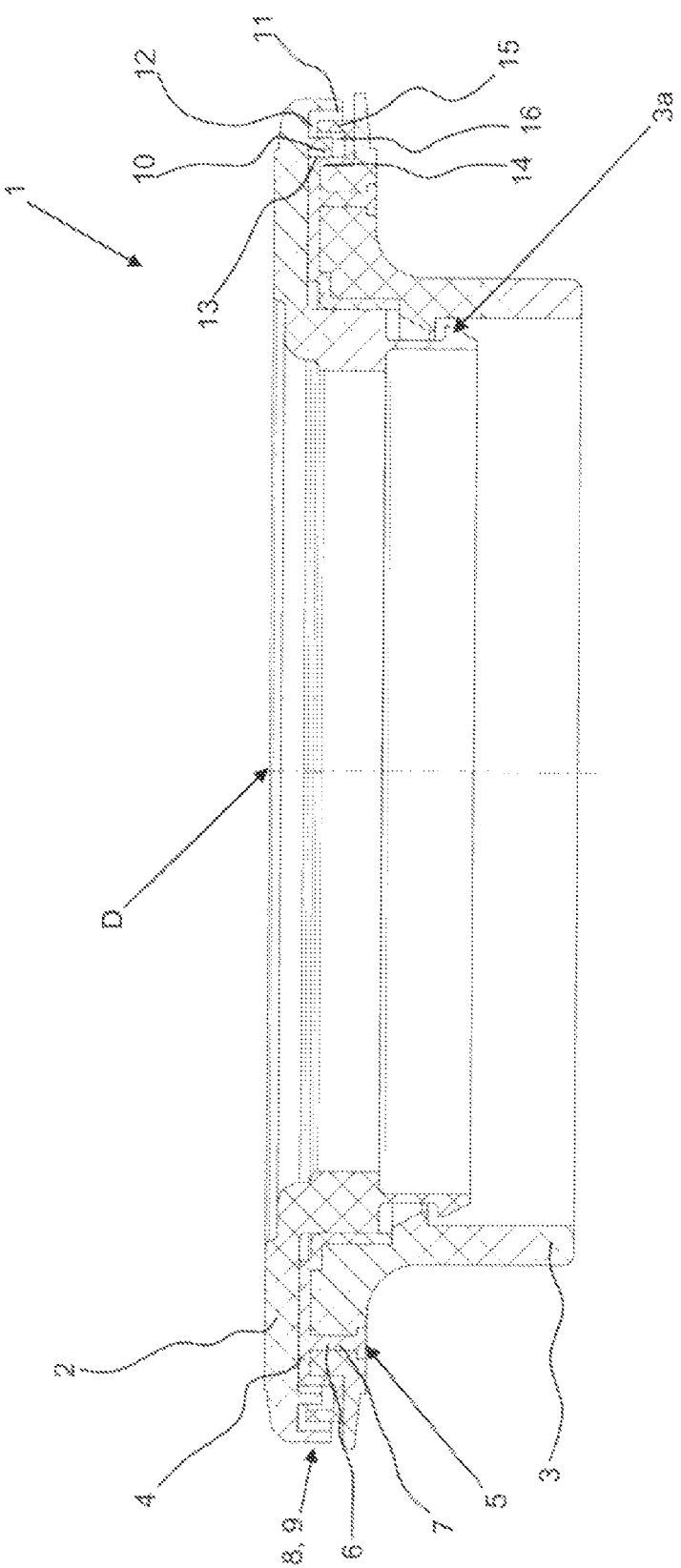

STRUT BEARING

FIELD OF THE INVENTION

The invention relates to a strut bearing that is intended for use in struts.

BACKGROUND

Strut bearings are part of the wheel suspension in independent wheel suspensions. The wheel suspension supports a desired driving safety and driving comfort, as well as easy and precise steering of the wheels. The wheel suspension should keep road surface noises from the vehicle body and should be as lightweight as possible. Depending on the design, the strut bearing guides the shock absorber spring and forms a support surface for the shock absorber end stop. The strut bearing absorbs the radial and axial forces transmitted via the shock absorber spring or to the shock absorber and ensures that the shock absorber spring rotates with little friction and no torsion and thus operates without a restoring moment.

Strut bearings are often part of the so-called MacPherson strut. The strut essentially is formed of the spring, shock absorber, and steering knuckle. The strut bearing is provided with a cap that is mounted on the chassis-side strut brace, as well as with a guide ring on which the shock absorber spring is supported and guided by this guide ring. The guide ring is mounted so that it can rotate relative to the cap. During steering, the bearing allows a rotation of the spring relative to the vehicle body, because the entire strut rotates during steering motions.

From DE 10 2010 015 712 A1, a strut bearing is known that has a cap and a guide ring that can rotate relative to the cap. Between the cap and guide ring there is a plain bearing. The plain bearing is formed from a sliding element that is arranged between the guide ring and the cap.

EP 2 317 167 A1 discloses a strut bearing with a cap, a guide ring, and a plain bearing arranged in-between. The plain bearing is inserted into a recess of the guide ring and forms a sliding surface for the cap.

DE 10 2008 057 590 A1 describes a strut bearing that has a cap and a guide ring. The cap and the guide ring are made from metal. Between the cap and the guide ring there is a plain bearing that is formed from a synthetic resin.

SUMMARY

The objective of the present invention is to provide a strut bearing that is easy to assemble and can be produced economically. An additional objective of the invention is to provide a method for producing a guide ring.

According to the invention, the objective targeted at a strut bearing is achieved by a strut bearing with a cap and with a guide ring that is supported so that it can rotate about a rotational axis relative to the cap and with at least one seal, wherein a plain bearing is arranged between the cap and the guide ring and wherein the plain bearing is injection molded onto the guide ring.

According to the invention, the objective targeted at a method for producing a guide ring is achieved by a strut bearing in which the guide ring is injection molded and then the plain bearing is injection molded onto the guide ring.

Strut bearings have a cap and a guide ring connected captively to the cap by means of a snap-on connection. A bearing is provided between the cap and the guide ring. This bearing is formed as a plain bearing.

The strut bearings are mounted on the chassis-side spring mount or the top mount by means of the cap. A shock absorber spring that is guided by the guide ring is supported on the guide ring.

The strut bearing according to the invention has a guide ring on which the plain bearing is injection molded. This means that the guide ring and the plain bearing together form a single component. This component is constructed as a two-component part. The two-component part is produced, for example, by means of a two-component injection molding process in which the two components, i.e., the guide ring and the plain bearing, are connected to each other with an adhesive bond. For this purpose, in a first step the guide ring is injection molded and in a second step the plain bearing is injection molded against or onto the guide ring. Through such a formation of the strut bearing, it is possible to reduce the total number of components of the strut bearing, i.e., from three parts to two parts. This has, first, the advantage that material and production costs can be reduced. Second, assembly is simplified because only the cap and guide ring must be assembled. Positioning errors that might occur during the assembly of the guide ring and the plain bearing are prevented. In addition, lubricating such a strut bearing is only necessary between the plain bearing and the cap and not, as in the prior art, also between the plain bearing and the guide ring.

In another construction of the invention, an undercut is provided between the guide ring and the plain bearing to prevent a rotational motion of the guide ring and the plain bearing relative to each other. Such a construction prevents, for large forces acting on the guide ring, the plain bearing from twisting or rotating relative to the guide ring or vice versa. To construct the undercut, one of the components (guide ring or plain bearing) can have extensions, arms, tabs, or the like, which engage in complementary recesses of the other component (guide ring or plain bearing). For this purpose, for example, in a first production step, the guide ring can be produced with corresponding recesses by means of the corresponding injection molding process. Then in a second production step the plain bearing is injection molded, so that corresponding arms or extensions flow into the recesses and then harden there. The undercut can be provided in some sections or also across the entire periphery.

Preferably the guide ring is made from a glass fiber-reinforced plastic. The glass fiber-reinforced plastic guarantees the necessary stability and stiffness of the guide ring. As the glass fiber-reinforced plastic, a polyamide, for example, a PA66-GF, can be provided. The use of a different plastic or metal that has the same properties is also possible.

In one construction of the invention, the plain bearing is made from a non-reinforced plastic. As the non-reinforced plastic, for example, a polyoxymethylene or a polyethylene can be used. Consequently, mixed friction and stick-slip effects can be reduced or prevented.

In one construction of the invention, the seal is formed as a labyrinth seal. Preferably, the labyrinth is formed as a multiple labyrinth seal. The guide ring and/or the plain bearing are formed such that this/these have at least one projecting rim. The cap is formed analogous to the guide ring or the plain bearing such that the cap has a projecting rim. The cap and the guide ring or the plain bearing can engage in each other by means of the formed rims, wherein a labyrinth-like structure is formed. This prevents contaminating particles from being able to enter into the strut bearing, which enables the strut bearing to move in the radial direction.

BRIEF DESCRIPTION OF THE DRAWINGS

An embodiment of the invention is shown below with reference to a FIGURE. Shown are:

FIG. 1 a longitudinal section through a strut bearing according to the invention.

DETAILED DESCRIPTION OF THE PREFERRED EMBODIMENTS

FIG. 1 shows a longitudinal section through a strut bearing 1 according to the invention. The strut bearing 1 has a cap 2, as well as a guide ring 3 that is supported so that it can rotate about a rotational axis D relative to the cap 2. The cap 2 is connected to the guide ring 3 by means of a snap-on connection 3a. The cap 2 is mounted on a not-shown strut mount of a chassis of a motor vehicle. The guide ring 3 holds an axial end of a not-shown shock absorber spring. Spring forces of the shock absorber spring are guided by means of the guide ring 3 into the cap 2 and from there into the strut mount.

The guide ring 3 is supported by means of a plain bearing 4 on the cap 2 axially in the direction of the rotational axis D. The plain bearing 4 is used to transmit forces acting along the rotational axis D from the guide ring 3 to the cap 2.

The plain bearing 4 is injection molded against or on the guide ring 3. Preferably, the guide ring is produced in a two-component injection molding method in which the guide ring 3 is injection molded first and then the plain bearing 4 is injection molded while forming an adhesive bond.

As can also be seen from FIG. 1, an undercut 5 is provided between the guide ring 3 and the plain bearing 4. For this purpose, the plain bearing 4 has "arms" 6 that engage in the corresponding recesses 7 of the guide ring 3. The undercut 5 is already made during the injection molding process.

Between the guide ring 3 and the cap 2 there is a labyrinth seal 8 that is preferably formed as a double labyrinth seal 9.

For this purpose, the cap 2 is provided on its outer periphery with the two annual, closed rims 10, 11 that are arranged coaxial to the rotational axis D and delimit a peripheral ring groove 12. The two rims 10, 11 formed integrally on the cap 2 extend with their free ends in the direction toward the guide ring 3. Between the rim 10 and the plain bearing 4 there is an annular recess 13 that is delimited on one side by the plain bearing 4 and on the other side by the rim 10.

The guide ring 3 and the plain bearing 4 are provided on the outer periphery with two annular, closed rims 14, 15, respectively, that are arranged coaxial to the rotational axis D and delimit a peripheral annular groove 16. The two rims 14, 15 formed integrally on the guide ring 3 and the plain bearing 4, respectively, extend with their free ends in the direction toward the cap 2.

The rims 10 and 11 are arranged radially offset relative to the rims 14 and 15. The rim 15 engages in the annular groove 12. The rim 10 of the cap 2 engages in the annular groove 16.

LIST OF REFERENCE NUMBERS

D Rotational axis
1 Strut bearing
2 Cap
3 Guide ring
3a Snap-on connection
4 Plain bearing
5 Undercut
6 Arm
7 Recess
8 Labyrinth seal
9 Double labyrinth seal
10 Rim
11 Rim
12 Annular groove
13 Annular recess
14 Rim
15 Rim
16 Annular groove

The invention claimed is:

1. A strut bearing comprising a cap and a guide ring that is supported so that it is rotatable about a rotational axis (D) relative to the cap, at least one seal, and a plain bearing arranged between the cap and the guide ring, wherein the plain bearing is injection molded on the guide ring, an undercut is provided between the guide ring and the plain bearing to prevent rotational motion of the guide ring and the plain bearing relative to each other, and the plain bearing includes an arm that engages the undercut such that the plain bearing is positively axially retained with the guide ring.

2. The strut bearing according to claim 1, wherein the guide ring is made from a glass fiber-reinforced plastic.

3. The strut bearing according to claim 1, wherein the plain bearing is made from a non-reinforced plastic.

4. The strut bearing according to claim 1, wherein the seal is formed as a labyrinth seal.

5. A method for producing a guide ring of a strut bearing, wherein the strut bearing has a cap and a guide ring that is supported so that it is rotatable about a rotational axis (D) relative to the cap and with a seal, and a plain bearing arranged between the cap and the guide ring, the guide ring including an undercut and the plain bearing including an arm, comprising the following steps:
  injection molding the guide ring, and
  injection molding the plain bearing onto the guide ring, such that the arm of the plain bearing engages the undercut of the guide ring to prevent rotational motion of the guide ring and the plain bearing relative to each other, and the plain bearing is positively axially retained by the arm engaging the undercut of the guide ring.

* * * * *